Oct. 1, 1957  A. W. GAUBATZ  2,808,007
GEAR PUMP OR MOTOR
Filed May 27, 1954  3 Sheets-Sheet 1

INVENTOR
Arthur W. Gaubatz
BY
L. D. Burch
ATTORNEY

Oct. 1, 1957  A. W. GAUBATZ  2,808,007
GEAR PUMP OR MOTOR

Filed May 27, 1954  3 Sheets-Sheet 2

INVENTOR
Arthur W. Gaubatz
BY
ATTORNEY

Oct. 1, 1957 A. W. GAUBATZ 2,808,007
GEAR PUMP OR MOTOR
Filed May 27, 1954 3 Sheets-Sheet 3

INVENTOR
Arthur W. Gaubatz
BY L. D. Burch
ATTORNEY

United States Patent Office 2,808,007
Patented Oct. 1, 1957

2,808,007

GEAR PUMP OR MOTOR

Arthur W. Gaubatz, Indianapolis, Ind., assignor to General Motors Corporation, Detroit, Mich., a corporation of Delaware Application May 27, 1954, Serial No. 432,702

7 Claims. (Cl. 103—126)

This invention relates to gear pumps and like devices, and more particularly to means for radially balancing the same.

Pumps commonly used to deliver lubricating oils or liquid fuels under high pressures often comprise a pair of meshing gears rotatably mounted within a housing having low pressure inlet and high pressure outlet openings therein.

It has long been recognized that the resultant radial forces on the gears due to the high outlet and low inlet pressures cause the gears to be radially unbalanced so that excessive wear on one side of the bearings and binding of the gears occur. Means have already been devised for radially balancing the gears of such pumps, which means usually comprise the provision of high and low pressure balancing chambers communicating with the high and low pressure outlet and inlet openings respectively.

The above means for radially balancing such gears, though satisfactory in theory, have been somewhat unsatisfactory in practice largely because of the manner in which communication is provided between the high and low pressure outlet and inlet openings and the oppositely disposed balancing chambers. The communicating passages have usually been provided in the end covers of the pump housing, either by casting or by machining. Casting is, of course, a costly and otherwise undesirable method of providing passages through a piece of metal, especially where the passages are small in diameter and circuitous in direction. Where the passages are machined, they usually comprise open recesses in the end covers of the pump so that oil under pressure is permitted to apply an axial thrust on the gears. Machining such passages in the covers for the housing to simulate cast passages is again too expensive.

It is now proposed to provide pumps and other devices of this type in which the passages for communication between the high and low pressure outlet and inlet openings of the housing and the respective balancing chambers are more easily and cheaply provided, and without the above objections. This is accomplished by locating these passages not in the housing covers, but in the bearings or bushings between the housing and the gear shafts. Since these passages comprise open slots in the bushings which are closed by the portion of the housing receiving the bushings, the construction and maintenance thereof is simple and inexpensive.

In the drawings:

Figure 2 illustrates an assembly having two gear pumps, each embodying the invention.

Figure 1:
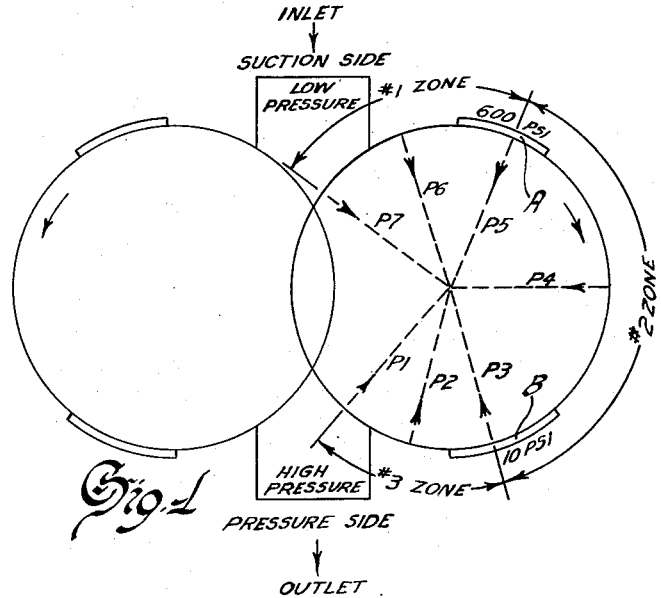
Figure 1 is a schematic illustration of the pressure obtaining in a gear pump in which balancing chambers are provided.
Figure 2:
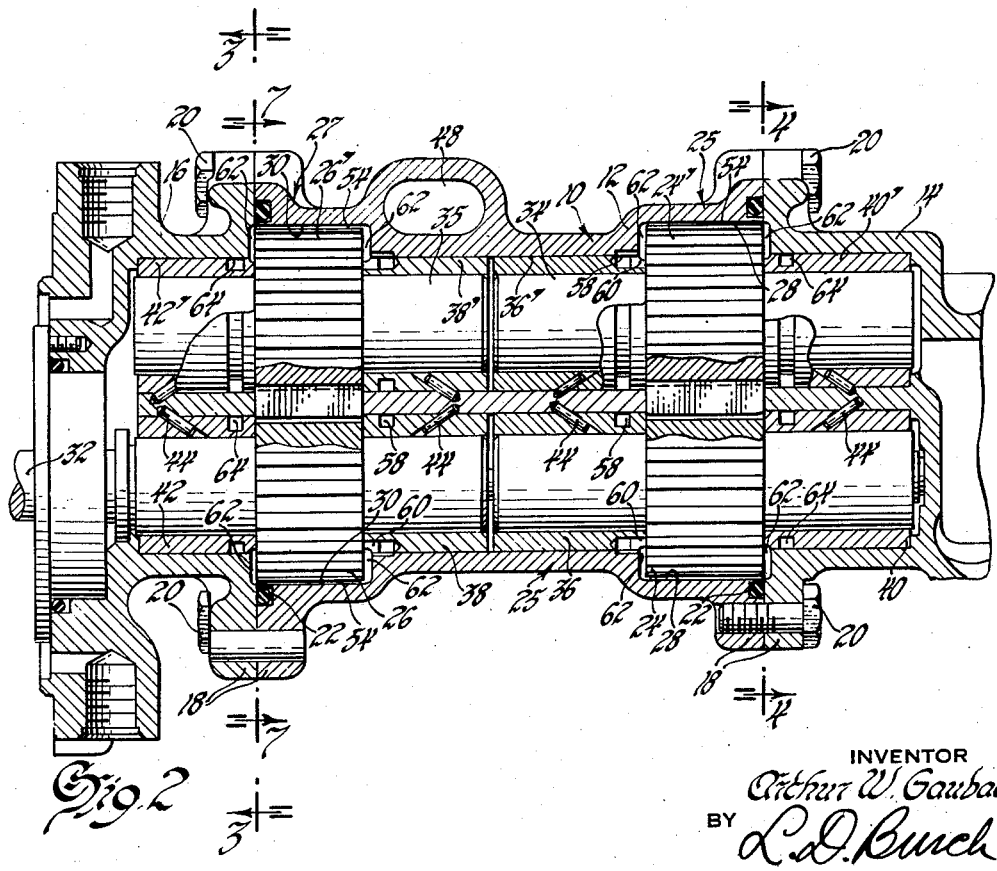
Figure 2 is a cross-sectional view taken in the plane of line 2—2 of Figure 7 and looking in the direction of the arrows.
Figure 3:
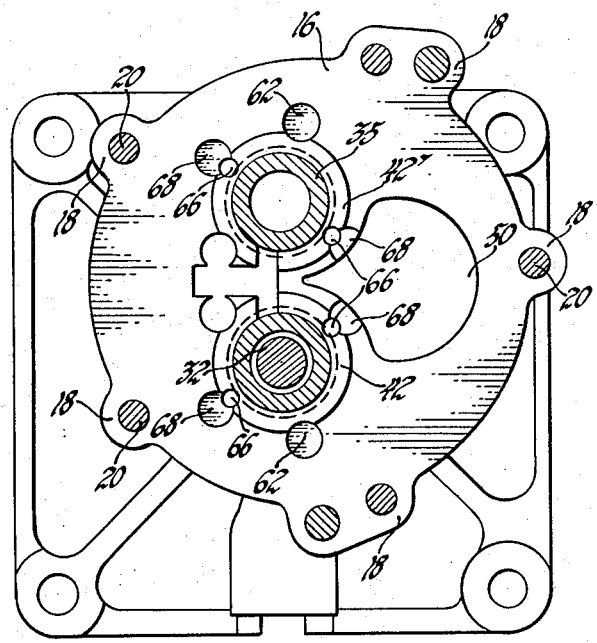
Figure 3 is a cross-sectional view taken in the plane of line 3—3 of Figure 2 and looking in the direction of the arrows.
Figure 5:
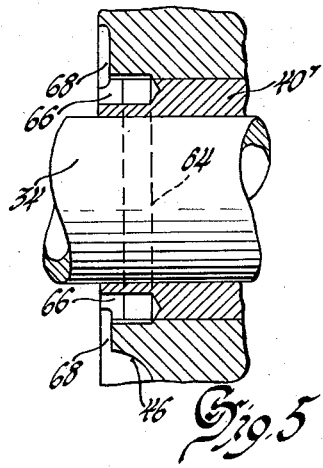
Figure 5 is a cross-sectional view taken in the plane of line 5—5 of Figure 4 and looking in the direction of the arrows.
Figure 4:
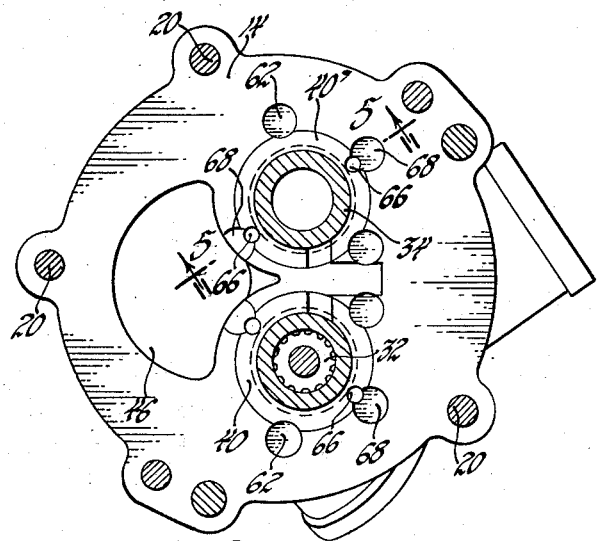
Figure 4 is a cross-sectional view taken in the plane of line 4—4 of Figure 2 and looking in the direction of the arrows.
Figure 6:
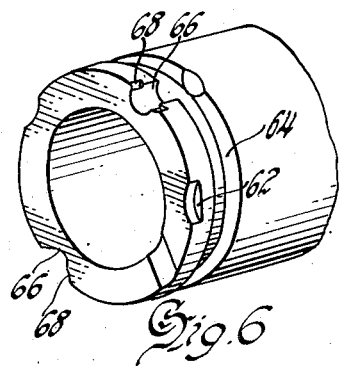
Figure 6 is a perspective view of an end portion of one of the bushings shown also by Figures 2–5, 7, and 8.
Figure 7:
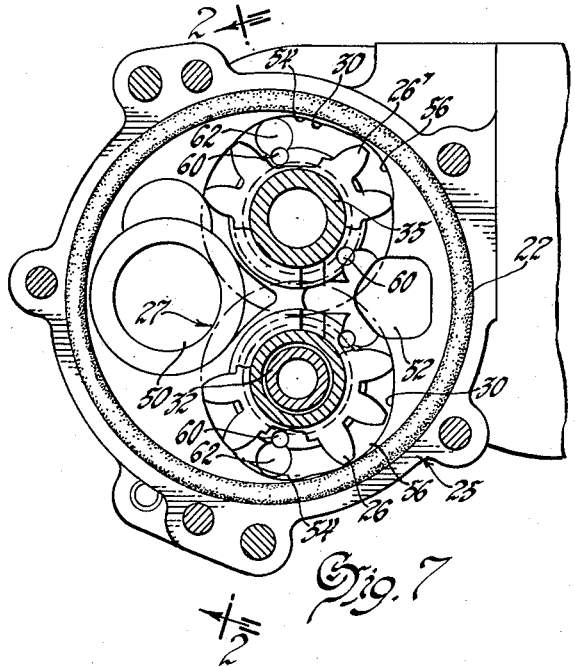
Figure 7 is a cross-sectional view taken in the plane of line 7—7 of Figure 2 and looking in the direction of the arrows.
Figure 8:
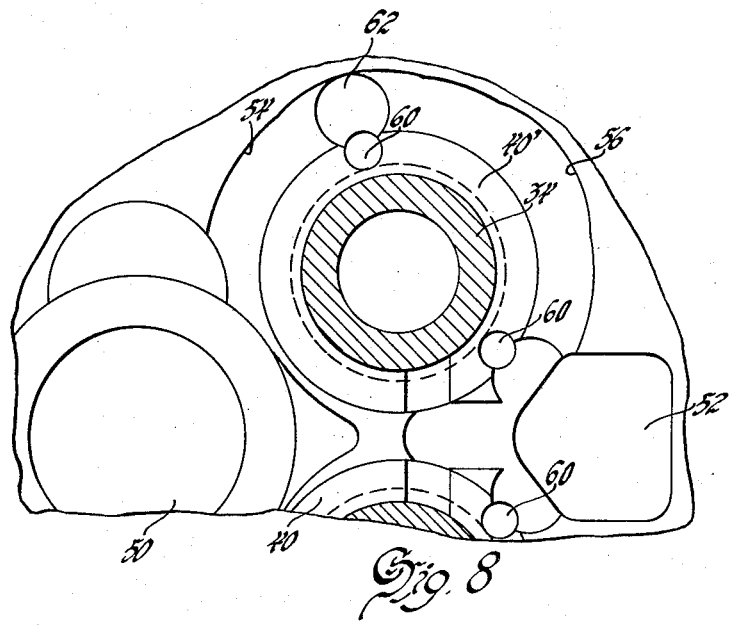
Figure 8 is an enlarged cross-sectional view, with portions thereof cut away, illustrating the structure shown by Figure 7, but with the gears removed.

By way of introduction, Figure 1 illustrates schematically the pressures that obtain in a gear pump and the effects of providing balancing chambers in such a pump. It will be noted that in the typical gear pump illustrated the inlet or suction side of the pump may be under a relatively low pressure, 10 p. s. i. or less for example, while the discharge or outlet side of the pump may be under a relatively high pressure of 600 p. s. i. Assuming a direction of rotation of the gears as shown by the arrows, the gear in a pump not having the balancing chambers A and B would be subjected to gradually increasing radial pressures P7 through P1, with a resultant radial thrust of considerable magnitude in the direction, for example, of the force P2. To alleviate this condition, the balancing chamber A, the exact area and location of which can be accurately determined, may be connected to the high pressure outlet. The exact area and location of the low pressure balancing chamber B also may be accurately determined to counteract the low pressure unbalance. By judicious provision of these balancing chambers the resultant load on the bearings can be held to a minimum.

The provision of balancing chambers of this kind, however, is a well known device for balancing such gears. It is evident from the above introduction that the pressures obtaining in a gear pump may be relatively high so that when the inlets and outlets are connected to their respective balancing chambers by means of open passages formed in the end covers of the pump considerable end thrust is placed on the gears. The present invention comprises novel means of providing communication between the high pressure outlet and the high pressure balancing chambers A, as well as between the low pressure inlet and the low pressure balancing chambers B.

Referring now to Figures 2–8, a gear pump embodying the invention comprises a housing 10, including a tubular central portion 12, an inlet end cover portion 14 and a drive end cover portion 16, each having flanges 18 bolted together by means of bolts 20. The end cover portions 14 and 16 may be sealed with the center portion 12 through seals 22. A pair of meshing gears 24 and 24' comprising a primary pump 25 and a second pair of meshing gears 26 and 26' comprising a secondary pump 27 are located within end recesses or gear chambers 28 and 30 provided in the center portion 12 of the housing 10. In the particular construction of pump shown, drive gears 24 and 26 are mounted on common shaft 32 and gears 24' and 26' are mounted on shafts 34 and 35, respectively. The shafts 32, 34 and 35 are supported within the central portion 12 of the housing 10 by means of bushings 36 and 36' and 38 and 38' and in the end portions 14 and 16 of the housing 10 by means of bushings 40 and 40' and 42 and 42', respectively. It will be noted that all of the bushings may be locked against rotation by means such as pins 44. In the particular pump shown, primary pump 25 and secondary pump 27 may be connected in series, in which case the liquid to be pumped enters the primary pump 25 by means of inlet 46 and leaves by means of an outlet not shown. The portions of the inlet and outlet immediately adjacent the pump gears respectively constitute the low pressure chamber and the high pressure chamber of pump 25. These chambers are on opposite sides of the point of mesh of the pump gears and adjacent their peripheries. The liquid then enters the secondary pump 27 by means of passage 48 and inlet 50 and leaves by means of outlet 52. The portion of inlet 50 immediately adjacent the mesh point of the gears constitutes the low pressure chamber of pump 27. The portion of outlet 52 immediately adjacent the mesh point of the gears constitutes the high pressure chamber of the pump. The remaining portion of the pump structure shown which is not described below is not material to the invention and comprises the usual means of mounting the pump on a supporting member and the like.

The gear cavities 28 and 30 are machined for a close fit with the gears except at 54 and 56 to form high pressure balancing chambers 54 and low pressure balancing chambers 56. The high pressure outlet 52 from the secondary pump 27 and that, not shown, from the primary pump 25 are connected to the high pressure balancing chambers 54 by means of annular recesses or passages 58, the axial passages 60 and shallow spot faces 62 in the bushings 36, 36', 38 and 38' and in each of the end portions 14 and 16. It will be noted that the spot faces 62 are disposed on opposite sides of the gears 24, 24', 26 and 26' to relieve any end thrust that would be applied at the spot face or counterbore on the passage 58 side of the gears. Low pressure balancing chambers 56 are similarly connected to the low pressure inlets 46 and 50 by means of annular grooves or passages 64 in bushings 40, 40', 42 and 42' as well as by axial passages 66 in the bushings and the counterbores 68 in the bushings and in each of the end portions 14 and 16. The counterbores 68 are thus also disposed on opposite sides of the gears to balance out any end thrust.

From the above specification and drawings, it is apparent that there has been provided novel and inexpensive means for radially balancing the gears of a pump which completely eliminates the problem of axial thrust on the gears.

What is claimed is:

1. In a pump having an inlet and an outlet and including a housing having low and high pressure chambers and having rotatably mounted therein a pair of meshing gears journaled by sleeve bearings on both sides of said gears, said low and high pressure chambers constituting respective portions of said inlet and said outlet immediately adjacent the point of mesh of said gears and circumferentially spaced on opposite sides thereof, means for radially and axially balancing said gears, comprising low and high pressure balancing chambers between the outer peripheries of each of said gears and the adjacent peripheral walls of said housing and disposed diametrically opposite said low and high pressure chambers respectively, said balancing chambers each extending axially and on both sides of each of said gears, continuous annular grooves formed in the outer peripheral walls of said sleeve bearings, said grooves being spaced from the ends of said bearings adjacent said gears and being closed by said housing to provide annular passages, passage means connecting said annular passages on one side of said gears with said high pressure chamber and each of said high pressure balancing chambers, and similar passage means connecting said annular passages on the opposite side of said gears with said low pressure chamber and each of said low pressure balancing chambers.

2. In a pump having an inlet and outlet and including a housing having low and high pressure chambers and having rotatably mounted therein a pair of meshing gears journaled by sleeve bearings on both sides of said gears, said low and high pressure chambers constituting respective portions of said inlet and said outlet immediately adjacent the point of mesh of said gears and circumferentially spaced on opposite sides thereof, means for radially balancing said gears, comprising low and high pressure balancing chambers between the outer peripheries of each of said gears and the adjacent peripheral walls of said housing and disposed diametrically opposite said low and high pressure chambers respectively, said balancing chambers each extending axially of each of said gears, continuous annular grooves formed in the outer peripheral walls of said sleeve bearings, said grooves being spaced from the ends of said bearings adjacent said gears and being closed by said housing to provide annular passages, passage means connecting said annular passages on one side of said gears with said high pressure chamber and each of said high pressure balancing chambers, and similar passage means connecting said annular passages on the opposite side of said gears with said low pressure chamber and each of said low pressure balancing chambers.

3. In a pump including a housing having an inlet and an outlet respectively forming low and high pressure chambers and having rotatably mounted therein a pair of meshing gears journaled by sleeve bearings on both sides of said gears, said pressure chambers being circumferentially spaced on opposite sides of and adjacent the mesh point of said gears, means for radially and axially balancing said gears, comprising low and high pressure balancing chambers between the outer peripheries of each of said gears and the adjacent peripheral walls of said housing and disposed diametrically opposite said low and high pressure chambers respectively, said balancing chambers each extending axially and on both sides of each of said gears, continuous annular grooves formed in the outer peripheral walls of said sleeve bearings, said grooves being spaced from the ends of said bearings adjacent said gears, passage means connecting said annular grooves on one side of said gears with said high pressure chamber and each of said high pressure balancing chambers, and similar passage means connecting said annular grooves on the opposite side of said gears with said low pressure chamber and each of said low pressure balancing chambers.

4. A radially balanced pump, including parallel shafts, a pump housing having an inlet and an outlet respectively forming a low pressure chamber and a high pressure chamber, at least one pumping means mounted on each of said shafts for common rotation therewith in said pump housing, said pressure chambers being immediately adjacent and arcuately spaced about said pumping means, said shafts being journaled by sleeve bearings in said housing on each side of said pumping means, each of said bearings having a continuous external annular groove spaced axially from the end thereof adjacent said pumping means, a low pressure and a high pressure balancing chamber for each of said pumping means disposed diametrically opposite said low pressure and high pressure chambers respectively, passage means connecting each of said low pressure balancing chambers with the corresponding annular recesses in said bearings on one side of said pumping means and thence with said low pressure chamber, and similar passage means connecting each of said high pressure balancing chambers and said high pressure chamber with the corresponding annular recesses in said bearings on the opposite side of said pumping means.

5. A radially and axially balanced gear pump, including parallel shafts, a pump housing, at least one pumping gear mounted on each of said shafts for common rotation therewith in said pump housing, said pump housing including an inlet and an outlet respectively including a low pressure chamber and a high pressure chamber peripherally adjacent said pumping gears, said shafts being journaled by sleeve bearings in said housing on each side of said gears, each of said bearings having a continuous external annular groove spaced axially from the end thereof adjacent said gears, a low pressure and a high pressure balancing chamber for each of said gears disposed diametrically opposite said low pressure and high pressure chambers respectively, each of said balancing chambers extending axially of said gears and on both sides thereof, axial passages connecting each of said low pressure balancing chambers with the corresponding annular recesses in said bearings on one side of said gears and thence with said low pressure chamber, and similar passages connecting each of said high pressure balancing chambers and said high pressure chamber with the corresponding annular recesses in said bearings on the opposite side of said gears.

6. A pump, comprising a housing and an end cover plate for said housing, said housing and said cover plate having axially aligned and axially parallel journal passages therein and said housing having pump inlet and outlet passages and recesses communicating concentrically with and disposed between said journal passages, bushings disposed in said journal passages, said bushings each having a continuous annular groove formed in the outer periphery thereof, said annular grooves being spaced from the ends of said bushings adjacent said recess, shafts mounted for rotation in said bushings, pumping means on each of said shafts and disposed in each of said recesses, said pumping means being in engagement and being generally in sealing contact with the peripheral walls of said recesses, a low pressure chamber between the inlet passage to said pump housing and the point of engagement of said pumping means and a high pressure chamber between said point of engagement and the outlet passage from the said housing, a low pressure balancing chamber between the outer periphery of each of said pumping means and the peripheral wall of each corresponding recess, a high pressure balancing chamber between the outer periphery of each pumping means and the peripheral wall of each corresponding recess, said low and high pressure balancing chambers being respectively positioned substantially diametrically opposite said low and high pressure chambers, passage means extending from said low pressure chamber to said annular passage in each of said bushings on one side of said pumping means and passage means extending from said annular passages to said corresponding low pressure balancing chamber, and similar passage means connecting said high pressure chamber and said high pressure balancing chambers with said annular passages in said bushings on the opposite side of said pumping means.

7. A pump, comprising a housing and an end cover plate for said housing, said housing and said cover plate having axially aligned and axially parallel journal passages therein and said housing having pump inlet and outlet passages and recesses communicating concentrically with and disposed between said journal passages, bushings disposed in said journal passages, said bushings each having a continuous annular groove formed in the outer periphery thereof, said annular grooves being spaced from the ends of said bushings adjacent said recess, shafts mounted for rotation in said bushings, a gear on each of said shafts and disposed in each of said recesses, the teeth of said gears being in meshing engagement and being generally in sealing contact with the peripheral walls of said recesses, a low pressure chamber between the inlet passage to said pump housing and the point of meshing of said gears and a high pressure chamber between said point of engagement and the outlet passage from the said housing, a low pressure balancing chamber between the outer periphery of each of said gears and the peripheral wall of each corresponding recess, said low pressure balancing chambers each extending on both sides of each of said gears, a high pressure balancing chamber between the outer periphery of each gear and the peripheral wall of each corresponding recess, each of said high pressure balancing chambers extending on both sides of each of said gears, said low and high pressure balancing chambers being respectively positioned substantially diametrically opposite said low and high pressure chambers, an axial passage extending from said low pressure chamber to said annular passage in each of said bushings on one side of said gears and an axial passage extending from said annular passages to said corresponding low pressure balancing chamber, and similar axial passages connecting said high pressure chamber and said high pressure balancing chambers with said annular passages in said bushings on the opposite side of said gears.

References Cited in the file of this patent

UNITED STATES PATENTS

| | | |
|---|---|---|
| 1,372,576 | Tullmann | Mar. 22, 1921 |
| 1,379,587 | Fisher | May 24, 1921 |
| 1,937,367 | Vickers | Nov. 28, 1933 |
| 2,212,994 | Vrolix | Aug. 27, 1940 |
| 2,221,412 | Rose | Nov. 12, 1940 |
| 2,319,374 | Ungar | May 18, 1943 |
| 2,338,065 | Ungar | Dec. 28, 1943 |
| 2,484,917 | Vertson | Oct. 18, 1949 |
| 2,541,010 | Ungar | Feb. 6, 1951 |
| 2,571,377 | Olah | Oct. 16, 1951 |
| 2,624,287 | Ilyin | Jan. 6, 1953 |
| 2,746,394 | Dolza et al. | May 22, 1956 |